United States Patent
Yu et al.

(10) Patent No.: US 11,520,681 B2
(45) Date of Patent: Dec. 6, 2022

(54) SYSTEM LOG COLLECTION METHOD

(71) Applicant: AMLOGIC (SHANGHAI) CO., LTD., Shanghai (CN)

(72) Inventors: Wei Yu, Shanghai (CN); Zhiwei Yan, Shanghai (CN)

(*) Notice: Subject to any disclaimer, the term of this patent is extended or adjusted under 35 U.S.C. 154(b) by 346 days.

(21) Appl. No.: 16/645,574

(22) PCT Filed: Oct. 31, 2018

(86) PCT No.: PCT/CN2018/113149
§ 371 (c)(1),
(2) Date: Mar. 9, 2020

(87) PCT Pub. No.: WO2019/144670
PCT Pub. Date: Aug. 1, 2019

(65) Prior Publication Data
US 2020/0301811 A1  Sep. 24, 2020

(30) Foreign Application Priority Data

Jan. 23, 2018  (CN) .......................... 201810064594.0

(51) Int. Cl.
*G06F 11/34* (2006.01)
*G06F 9/54* (2006.01)
(Continued)

(52) U.S. Cl.
CPC ........ *G06F 11/3476* (2013.01); *G06F 3/0635* (2013.01); *G06F 3/0679* (2013.01);
(Continued)

(58) Field of Classification Search
None
See application file for complete search history.

(56) References Cited

U.S. PATENT DOCUMENTS

2010/0228795 A1* 9/2010 Hahn ................... G06F 16/1737
707/812
2012/0054358 A1* 3/2012 Yamada .............. H04L 63/0869
709/229
(Continued)

FOREIGN PATENT DOCUMENTS

CN           1567182 A   *  1/2005
CN         104899129 A   *  9/2015
(Continued)

OTHER PUBLICATIONS

'Android OS with its Architecture and Android Application with Dalvik Virtual Machine Review' by Shaheen et al., International Journal of Multimedia and Ubiquitous Engineering vol. 12, No. 7 (2017). (Year: 2017).*

(Continued)

*Primary Examiner* — Steven G Snyder
(74) *Attorney, Agent, or Firm* — Clement Cheng

(57) ABSTRACT

The present invention provides a method for collecting system logs, applied to an intelligent device with an Android system, wherein providing a daemon process for log collecting, and the daemon process is started when the system of an Android device is started; providing an application process for log processing; providing an external storage device for accessing the intelligent device; the method comprises the following steps: the daemon process collects the application framework layer and logs of the Linux kernel, and saves the logs in a first storage path of the Android system; the application process creating a second storage path in the external storage device after identifying the accessed external storage device; and the application process obtaining the logs from the first storage path and saving the logs in the second storage path.

9 Claims, 3 Drawing Sheets

(51) Int. Cl.
*G06F 9/30* (2018.01)
*G06F 3/06* (2006.01)
(52) U.S. Cl.
CPC ...... *G06F 9/30043* (2013.01); *G06F 9/30098* (2013.01); *G06F 9/545* (2013.01); *G06F 3/0604* (2013.01)

(56) References Cited

U.S. PATENT DOCUMENTS

| | | | | |
|---|---|---|---|---|
| 2012/0089651 | A1* | 4/2012 | Hahn | G06F 16/1737 |
| | | | | 707/822 |
| 2014/0208083 | A1* | 7/2014 | Burnett | G06F 11/3636 |
| | | | | 712/228 |
| 2017/0315899 | A1* | 11/2017 | Abdul | G06F 11/301 |
| 2018/0210806 | A1* | 7/2018 | Abdul | G06F 11/3495 |
| 2019/0227899 | A1* | 7/2019 | Abdul | G06F 11/3664 |

FOREIGN PATENT DOCUMENTS

| | | | | |
|---|---|---|---|---|
| CN | 105205142 | | 12/2015 | |
| CN | 106155875 | A * | 11/2016 | |
| CN | 106815128 | | 6/2017 | |
| CN | 106815128 | A * | 6/2017 | |
| CN | 106919494 | | 7/2017 | |
| CN | 107992407 | A * | 5/2018 | .......... G06F 11/3648 |
| CN | 110716845 | A * | 1/2020 | |
| CN | 110740366 | A * | 1/2020 | |
| CN | 110764962 | A * | 2/2020 | .......... G06F 11/3065 |
| CN | 112000405 | A * | 11/2020 | |
| CN | 112416733 | A * | 2/2021 | ............ G06F 11/366 |
| WO | WO-2010104814 | A1 * | 9/2010 | ......... G06F 16/1737 |
| WO | WO-2016037488 | A1 * | 3/2016 | ............ G06F 12/14 |
| WO | WO-2018040968 | A1 * | 3/2018 | ............. G06F 11/22 |

OTHER PUBLICATIONS

'File Splitter for Android: Split Any File Into Smaller-Sized Segments' by A. Rehman, Sep. 30, 2011. (Year: 2011).*
'Android Architecture' from Tutorials Point, archived from Jan. 6, 2017. (Year: 2017).*
Machine Translation of CN 106815128 A1, Jun. 2017. (Year: 2017).*

* cited by examiner

SYSTEM LOG COLLECTION METHOD

BACKGROUND OF THE INVENTION

1. Field of the Invention

The invention relates to the field of communication technologies, and more particularly, to a method for collecting system logs.

2. Description of the Related Art

System logs are used to record information of hardware, software and system problems in a system, and to monitor events occurring in the system. Users may find out the cause of errors through the system logs, or look for traces left by attackers in the event of attack. In the Android system, many methods for collecting the logs are available, but all of them are quite disperse.

The existing log collection system can obtain logs by inputting related commands. Specifically, if you want to view logs of the framework layer, you need to input "logcat" to get the output information; if you want to see logs of the kernel, you need to input "dmesg" to get the output information; if you want to see the running status of each service in the Android layer, you need to input "dumpsys" to get the output; and all of those actions depend on the fact that the device with the Android system is connected to a computer by means of a serial port line and a USB line, and manually input the above-mentioned processes through the serial port line of the computer and an ADB command; otherwise, debugging information cannot be obtained. When the system crashes, Android will save tombstone to catalog /data/tomebstones/ by default. If the application does not respond, Android will save traces.txt to catalog /data/anr/, and other logs will be output to the memory. Some other log collection systems collect Android's native disperse logs, save them to the sdcard or the U disk, and finally take the log files from the sdcard or the U disk to the computer for analysis.

The above-mentioned log collection methods have the following disadvantages: in the Android default log collection methods, a serial port line or a USB line must be connected to the computer. However, a problem is that it is inconvenient for providing an external serial port line or the USB line during production in the factory. As a result, debugging information is not accessible to the debuggers, so debugging operations may not be performed as expected. In this case, production line will always suspend; the external serial port line or the USB cable are provided; and input a command to export logs for analysis. If it is intended to adopt the method of ADB by using the USB cable, the Android device must have an OTG port. However, OTG ports are not always provided in set-top boxes and smart televisions, so debugging operations are impossible through USB ADB. Generally, internet ADBs are not enabled by default in the factory firmware.

Since Android system outputs logs to the memory by default, which is a circular buffer. If this buffer is full, subsequent logs will overwrite previous ones, making relevant useful information inaccessible.

Furthermore, if it is desired to obtain relevant logs in the framework layer, user needs to input "logcat" instruction after startup. Once it is power off or is restarted, information of those logs will be gone; or if the buffer is full, subsequent logs will overwrite previous ones, which on site information in which problems occur may get lost. In this case, it is hard to find out where the problems lie.

During startup and shutdown of pressure testing, if one shutdown fails, the log buffer will be full after a long period of time, and the previous useful logs will be overwritten. It is too late to obtain the logs by inputting the "logcat" later on, making it impossible to find out where the problems lie.

SUMMARY OF THE INVENTION

In order to solve the above-mentioned problems in relation to collecting logs in the prior art, the present invention provides a method for unified collection of dispersed logs. In this method, an intelligent device is allowed to obtain the logs without the need for providing an external serial port line and a USB line.

The detailed technical solution is as follows:

a method for collecting system logs, applied to an intelligent device with an Android system, an architecture of the Android system comprising in sequence of, from top to bottom, an application layer, an application framework layer, a system library and a Linux kernel, wherein providing a daemon process for log collecting, and the daemon process is started when the system of an Android device is started;

providing an application process for log processing;

providing an external storage device for accessing the intelligent device;

the method comprises:

step S1, the daemon process collects the application framework layer and logs of the Linux kernel, and saves the logs in a first storage path of the Android system;

step S2, the application process creates a second storage path in the external storage device after identifying the accessed external storage device; and step S3, the application process obtains the logs from the first storage path and saves the logs in the second storage path.

Preferably, providing a configuration file in which the first storage path and startup parameters for the daemon process are formed; and providing an initial process for starting itself when the Android system is started, the initial process being used to load the configuration file so as to start the daemon process.

Preferably, the initial process is an init process in the Android system.

Preferably, the daemon process divides the log into a plurality of logs according to a predetermined size, and it may save a predetermined number of logs at each time.

Preferably, the predetermined size is 1 MB, and the predetermined number is 10.

Preferably, after the application process is started, registering to the Android system so as to form a recording module and a detecting module;

the method for creating the second storage path comprises:

step A1, after the external storage device accesses the intelligent device, the Android system sends a detection instruction to the detecting module;

step A2, the detecting module detects, according to the detection instruction, whether a target script file exists in a root directory of the external storage device;

if not, then exit;

step A3, the second storage path and a third storage path are created in the external storage device, wherein the recording module is used to record status information of an application which is currently running in the Android system to the third storage path.

Preferably, in prior to creating the second storage path, further comprising:

step B1, the detecting module detects whether a storage capacity of the external storage device is greater than a preset standard storage capacity;

if yes, turning to step A3;

if not, then exit.

Preferably, the standard storage capacity is 50 MB.

Preferably, in step A2, the recording module detects whether an instruction for acquiring a register in the intelligent device exists in the script file of the external storage device;

If yes, starting an instruction thread, through which the status information of the register is obtained;

If not, then exit.

Preferably, the external storage device is a SD card, and/or the external storage device is a USB flash disk.

The above-mentioned technical solution has the following advantages or beneficial effects: saving all the logs in the system, such that user may search for the logs conveniently; collecting the logs through the daemon process provided; what is collected comprises kernel logs, and saving related documents in the device, thereby ensuring that on site logs, having problems incurred previously, may be saved during a pressure test;

in addition, the the logs in the intelligent device can be acquired without the need for providing an external serial port line and a USB line; and problems occurring under the condition that the serial port line and the USB line cannot be externally connected in factory production and after-sales process, also can be quickly positioned.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
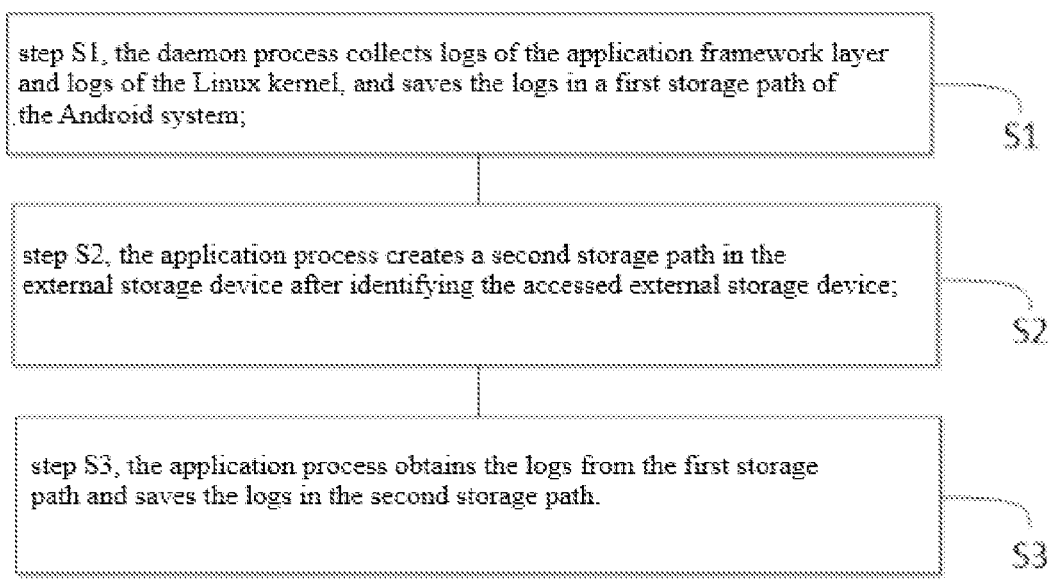
FIG. 1 is a flow chart of a method for collecting system logs according to an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, certain exemplary embodiments according to the present disclosure will be described with reference to the accompanying drawings.

The technical solution according to the present invention comprises a method for collecting system logs.

In one embodiment, there is provided a method for collecting system logs, applied to an intelligent device with an Android system, an architecture of the Android system comprising in sequence of, from top to bottom, an application layer, an application framework layer, a system library and a Linux kernel, wherein providing a daemon process for log collecting, and the daemon process is started when the system of an Android device is started;

providing an application process for log processing;

providing an external storage device for accessing the intelligent device;

as shown in FIG. 1, the method comprises:

step S1, the daemon process collects the application framework layer and logs of the Linux kernel, and saves the logs in a first storage path of the Android system;

step S2, the application process creates a second storage path in the external storage device after identifying the accessed external storage device; and step S3, the application process obtains the logs from the first storage path and saves the logs in the second storage path.

In the prior art, the system logs are collected in a disperse manner, and the intelligent device is connected to a host computer by means of a serial port line and a USB line, the instruction is edit through the host computer in the intelligent device so that the intelligent device may obtain the logs. While the existing intelligent device is not provided with the external serial port line and the USB interface for the sake of reducing costs and improving the appearance, as a result, debuggers cannot obtain the logs in time.

In the present invention, the daemon process is provided in the system of the intelligent device, that is, after the system of the device is started, that is, after entering the user state, the daemon process will obtain the application framework layer of the Android system and logs of the Linux kernel, and save it in a first storage path of the Android system, then save the logs in the first storage path to the accessed external storage device. Such a method overcomes the problem of complicated process in the prior art, that is, the system logs are collected in a disperse manner, and the intelligent device is connected to the host computer by means of the serial port line or the USB interface, and the instruction is typed through the host computer, to collect the logs.

In a preferred embodiment, providing a configuration file in which the first storage path and startup parameters for the daemon process are formed; and providing an initial process for starting itself when the Android system is started, the initial process being used to load the configuration file so as to start the daemon process.

In a preferred embodiment, the initial process is an init process in the Android system, and the configuration file is a script file of init.rc in the Android system;

in a preferred embodiment, the daemon process divides the log into a plurality of logs according to a predetermined size, and it may save a predetermined number of logs at each time.

In a preferred embodiment, the predetermined size is 1 MB, and the predetermined number is 10.

In the above-mentioned technical solution, add mkdir /data/log 0771 log log to the on post-fs-data in the init.rc document.

Creating a directory in which the logs are to be saved, that is, the first storage path, then after the daemon process is run, the logs may be saved in this directory.

2) Adding startup parameters for the daemon process in the init.ric:

service logcat /system/bin/logcat -b system -b events -b main -b crash -K -n 10 -v threadtime -f/data/log/logcat. log -r 1000
   class main
   user log
   group log
   seclabel u:r:logcat:s0

If so, after the Android system enters the first user state process init, the init process would start the daemon process, logcat.

The logcat daemon process may collect the logs that are printed to system, events, main and crash buffer zone by the system and the logs of the kernel dmesg. The logcat daemon process may save 10 logs, with each log having a size of 1 MB, and if the number of the logs exceeds 10, then the old logs saved previously will be overwritten, so as to circularly save the logs. The size of each log and the number of the logs saved may be configured by the debuggers themselves.

It should be noted that the native logcat of the Android system does not support saving the logs of the kernel. A parameter-K is extended in the configuration file, and the logs of the kernel may be saved at the same time, such that when abnormalities occur in the kernel layer, problems can be quick positioned from the logs.

Figure 2:
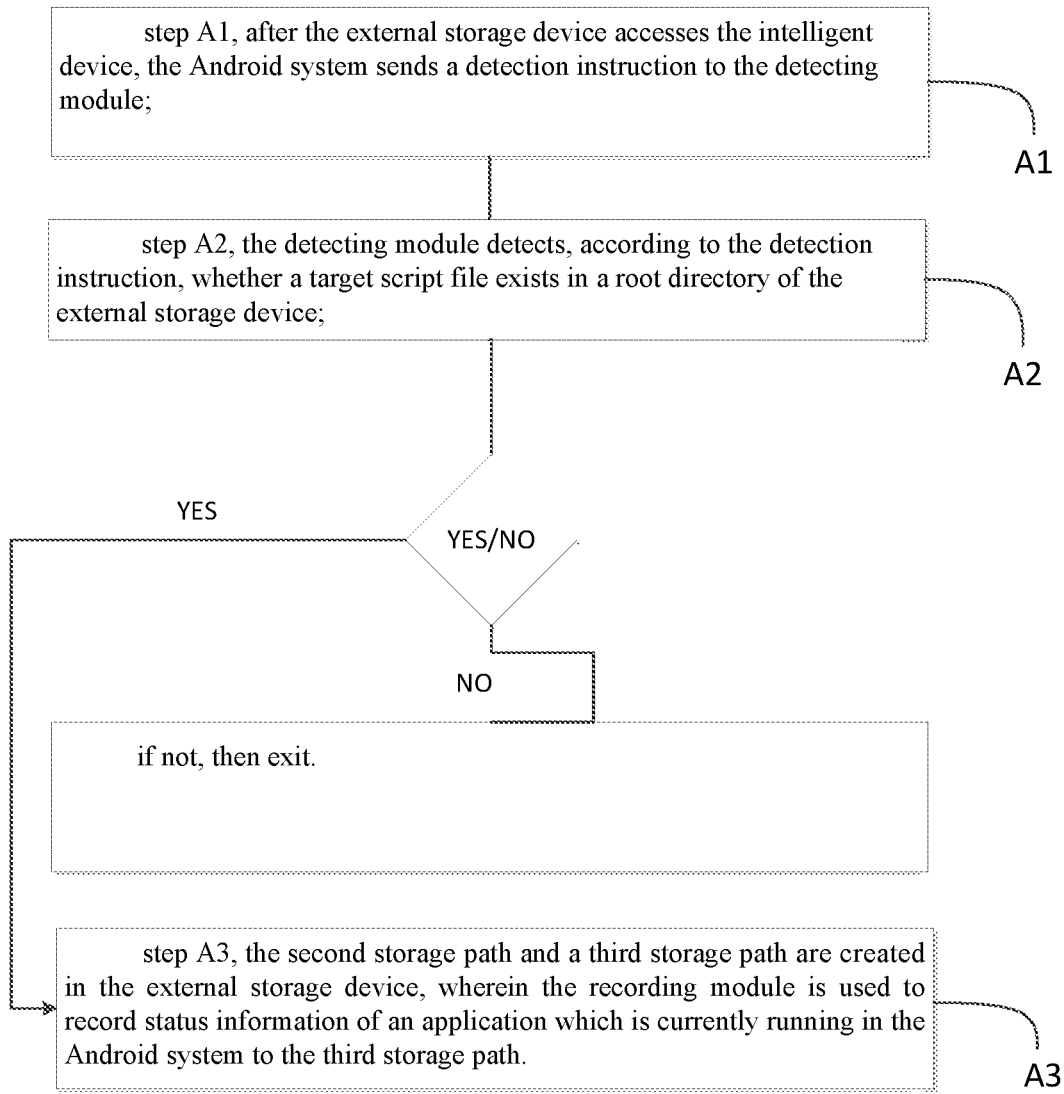
FIG. 2 is a flow chart showing an embodiment of how to form a second storage path in a method for collecting system logs according to an embodiment of the present invention.

In a preferred embodiment, after the application process is started, registering to the Android system so as to form a recording module and a detecting module;

as shown in FIG. 2, a method for creating the second storage path comprises:

step A1, after the external storage device accesses the intelligent device, the Android system sends a detection instruction to the detecting module;

step A2, the detecting module detecting, according to the detection instruction, whether a target script file exists in a root directory of the external storage device;

if not, then exit;

step A3, the second storage path and a third storage path are created in the external storage device, wherein the recording module is used to record status information of an application which is currently running in the Android system to the third storage path.

Figure 3:
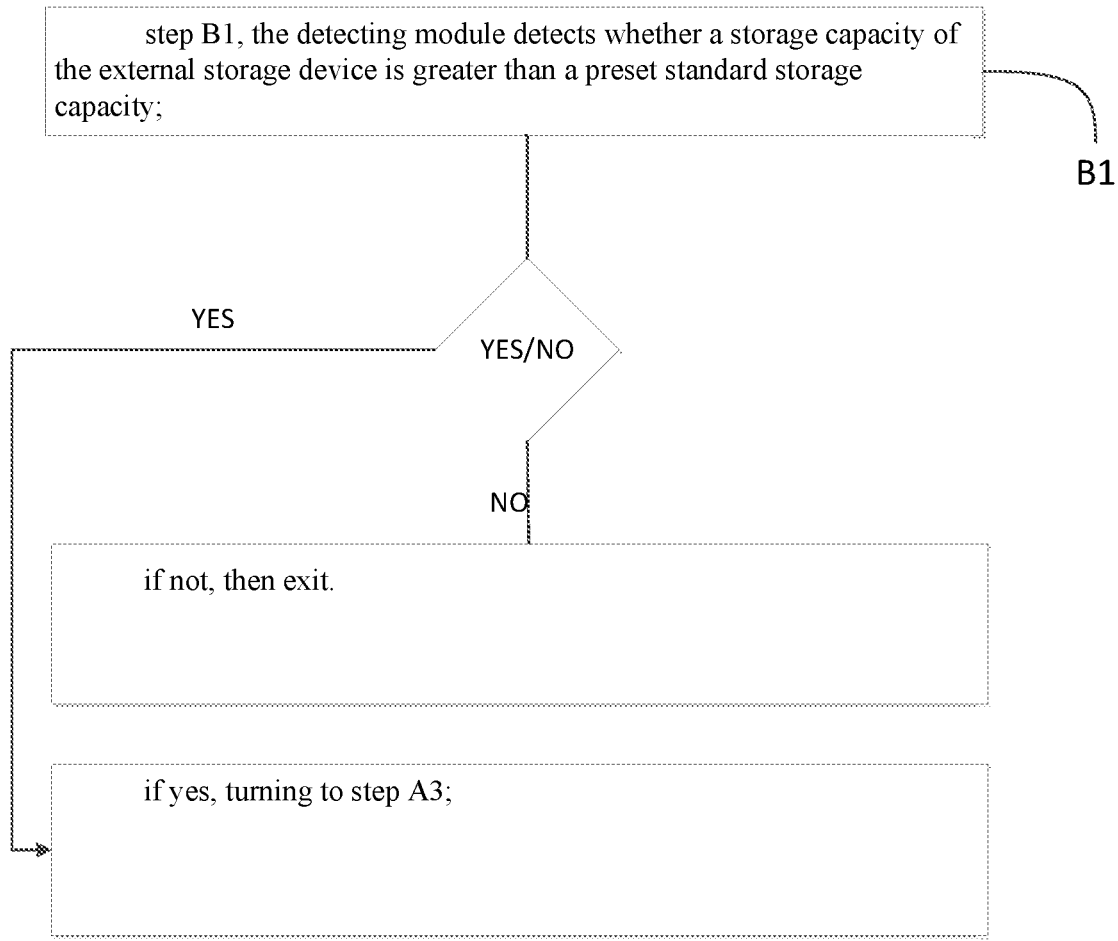
FIG. 3 is a flow chart showing an embodiment of a method for determining a capacity of an external access device in a method for collecting system logs according to an embodiment of the present invention.

In a preferred embodiment, in prior to creating the second storage path, as shown in FIG. 3, the method further comprises:

step B1, the detecting module detects whether a storage capacity of the external storage device is greater than a preset standard storage capacity;

if yes, turning to step A3;
  if not, then exit.

In a preferred embodiment, the standard storage capacity is 50 MB.

In a preferred embodiment, in step A2, the recording module detects whether an instruction for acquiring a register in the intelligent device exists in the script file of the external storage device;

If yes, starting an instruction thread, through which the status information of the register is obtained;

If not, then exit.

In a preferred embodiment, the external storage device is a SD card.

In a preferred embodiment, the external storage device is a USB flash disk.

The following description is illustrated by way of a specific embodiment. In an embodiment in which the external storage device is a Sdcard or a USB flash disk:

The application process (Readlog) registers a service: a recoding module (DumpServic);

--- a BroadcastReceiver: a detecting module (External StorageReceiver) to the system.
    Specifically:
    <service android:enabled="true"
        android:name="com.droidlogic.readlog.DumpService"/>
        <receiver
      android:name="com.droidlogic.readlog.ExternalStorageReceiver">
        <intent-filter>
          <action
android:name="android.intent.action.MEDIA_EJECT" />
          <action
android:name="android.intent.action.MEDIA_MOUNTED" />
            <data android:scheme="file"/>
        </intent-filter>
        </receiver>

---

After the sdcard or the USB flash disk is inserted into the intelligent device, the system ExternalStorageReceiver sends android.intent.action.MEDIA_MOUNTED broadcast;

After receiving the above instruction, ExternalStorageReceiver may judge whether any target script file (.AMLCOPYLOGS,) exists in the root directory of the sdcard or the USB flash disk; if not, then performing any processes; if yes, then DumpService may be started.

In this service, first of all, it may check whether the remaining storage space of the sdcard or the USB flash disk is greater than 50 MB; if not, then exit.

If the remaining space of the disk is greater than 50 MB, then a directory, that is, the second storage path, logs-yyMMdd_HHmmss, may be created in the root directory of the disk, then dumpsys thread is started, and the obtained information is saved in the third storage path logs-yyMMdd_HHmmss/dumpsys.txt. Then dumpsys thread is created, and other logs are saved. In this case, Files in /data/log/ will be read to logs-yyMMdd_HHmmss/log/

Files in /data/tombstones/ will be read to logs-yyMMdd_HHmmss/tombstones/

Files in /cache/recovery/ will be read to logs-yyMMdd_HHmmss/recovery/

Files in /data/anr/ will be read to logs-yyMMdd_HHmmss/anr/

Files in /system/build.prop will be read to logs-yyMMdd_HHmmss/build.prop

Running the instruction: getprop and dmesg save results in logs-yyMMdd_HHmmss/getprop.txt 和 logs-yyMMdd_HHmmss/dmesg.

In the prior art, native logs of Android are collected by the sdcard or the USB flash disk. It can avoid the use of the serial port line and the USB line. However, it is not applicable to the problems in the prior art when a blurred screen appears and it has to view the status of the register.

In the above-mentioned technical solution, an instruction of a target file in the external access device is run by the application process so as to view status information of the register and other components. In addition, it is a command of the script file which may be configured flexibly depending on different problems, and information related to an on site problem may appear in real time.

The detailed implementation is as follows:

If a command line exists in target script file which is placed in the sdcard or the USB flash disk in advance, then a command thread will be started, and the thread may be intended for obtaining a system status of the current register in the Android intelligent device.

The present invention is flexible and practical in the following application. Specifically, relevant information of osd register may be obtained by editing unused instructions in this target script file

```
AMLCOPYLOGS:
    View osd register and its relevant information:
    echo dump > /sys/class/graphics/fb0/debug
    cat /sys/class/graphics/fb0/window_axis
    cat /sys/class/graphics/fb0/scale_width
    cat /sys/class/graphics/fb0/scale_height
    screencap -p /storage/external_storage/udisk0/dump.png
    ddif=/dev/graphics/fb0
    of=/storage/external_storage/udisk0/osd.dump.bin
    View relevant information of a video
    echo 1 > /sys/module/amvideo/parameters/debug_flag
    cat /sys/class/video/video_state
    cat /sys/class/video/frame_width
    cat /sys/class/video/frame_height
    cat /sys/class/video/axis
    cat /sys/class/video/crop
    cat /sys/class/video/screen_mode
    cat /sys/module/amvideo/parameters/platform_type
    cat /sys/module/amvideo/parameters/process_3d_type
    cat /sys/class/video/frame_rate
    cat /sys/class/display/mode
    View information of afbc register
    echo 0xd0106b80 18 > /sys/kernel/debug/aml_reg/dump
    cat /sys/kernel/debug/aml_reg/dump
    View vframe information
    cat /sys/class/video/vframe_states
    cat /sys/class/ppmgr/ppmgr_vframe_states
    cat /sys/class/ionvideo/vframe_states
    cat /sys/class/vfm/map
    View interrupt information of rdma
    cat /proc/interrupts
    cat /sys/module/rdma_mgr/parameters/reset_count
    // View GPU information
    cat /sys/kernel/debug/mali/utilization_pp
    cat /sys/kernel/debug/mali/utilization gp
    cat /sys/kernel/debug/mali/utilization gp_pp
    cat /sys/kernel/debug/aml_clkmsr/clkmsr | grep mali
``` and other commands for viewing information of the register are placed at the end.

After running these commands, since output results of some commands are in the logs of the kernel, it is necessary to run the dmesg command, so as to obtain these output results.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A method for collecting system logs, applied to an intelligent device with an Android system, an architecture of the Android system comprising in the sequence of, from top to bottom, an application layer, an application framework layer, a system library and a Linux kernel, wherein providing a daemon process for log collecting, and the daemon process is started when the system of an Android device is started;
   providing an application process for log processing;
   providing an external storage device for accessing the intelligent device;
   the method comprises:
   step S1, the daemon process collects logs of the application framework layer and logs of the Linux kernel, and saves the logs in a first storage path of the Android system;
   step S2, the application process creates a second storage path in the external storage device after identifying the accessed external storage device; and
   step S3, the application process obtains the logs from the first storage path and saves the logs in the second storage path,
   wherein after the application is started, registering to the Android system so as to form a recording module and a detecting module;
   the method for creating the second storage path comprises:
   step A1, after the external storage device accesses the intelligent device, the Android system sends a detection instruction to the detecting module;
   step A2, the detecting module detects, according to the detection instruction, whether a target script file exists in a root directory of the external storage device;
   if not, then exit;
   step A3, the second storage path and a third storage path are created in the external storage device, wherein the recording module is used to record status information of an application which is currently running in the Android system to the third storage path.

2. The method for collecting system logs of claim 1, wherein providing a configuration file in which the first storage path and startup parameters for the daemon process are formed; and
   providing an initial process for starting itself when the Android system is started, the initial process being used to load the configuration file so as to start the daemon process.

3. The method for collecting system logs of claim 2, wherein the initial process is an init process in the Android system.

4. The method for collecting system logs of claim 1, wherein the daemon process divides the log into a plurality of logs according to a predetermined size, and it may save a predetermined number of logs at each time.

5. The method for collecting system logs of claim 4, wherein the predetermined size is 1 MB, and the predetermined number is 10.

6. The method for collecting system logs of claim 1, wherein prior to creating the second storage path, further comprising:

step B1, the detecting module detects whether a storage capacity of the external storage device is greater than a preset standard storage capacity;

if yes, turning to step A3;

if not, then exit.

7. The method for collecting system logs of claim 6, wherein the standard storage capacity is 50 MB.

8. The method for collecting system logs of claim 1, wherein in step A2, the recording module detects whether an instruction for acquiring a register in the intelligent device exists in the script file of the external storage device;

If yes, starting an instruction thread, through which a status information of the register is obtained;

If not, then exit.

9. The method for collecting system logs of claim 1, wherein the external storage device is a Secure Digital (SD) card, and/or the external storage device is a Universal Serial Bus (USB) flash disk.

* * * * *